W. H. CHIPLEY.
Apron-Supporter and Page.
No. 6,310. Reissued March 2, 1875.
FIG. I.
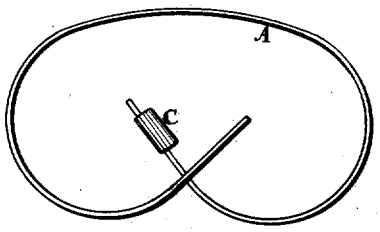
FIG. II.
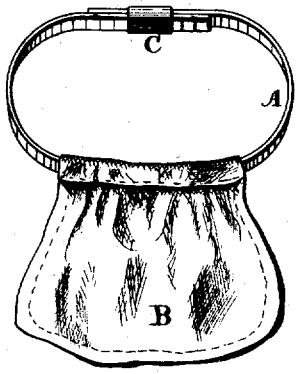
FIG. III.
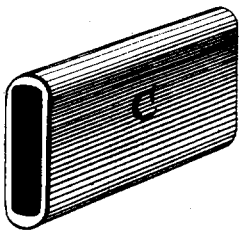
WITNESSES.
Neil H. Moron
Edwin J. McLain
INVENTOR.
Wm H. Chipley
per attys A. H. Evans & Co.

UNITED STATES PATENT OFFICE.

WILLIAM H. CHIPLEY, OF NEW MIDWAY, MARYLAND.

IMPROVEMENT IN APRON-SUPPORTERS AND PAGES.

Specification forming part of Letters Patent No. 147,479, dated February 17, 1874; reissue No. 6,310, dated March 2, 1875; application filed November 21, 1874.

*To all whom it may concern:*

Be it known that I, WILLIAM H. CHIPLEY, of New Midway, in the county of Frederick and State of Maryland, have invented certain new and useful Improvements in Spring-Zones or Apron-Supporters; and I do hereby declare the following to be a full, clear, and exact description of the invention, such as will enable others skilled in the art to which it pertains to make and use it, reference being had to the accompanying drawings, which form a part of this specification.

My invention relates to an improvement in spring-zones or apron-supporters; and it consists in the combination of the devices hereinafter explained.

In the drawings, Figure 1 is a plan view of my spring-zone, showing its shape when relieved from tension. Fig. 2 is a perspective view of my invention with an apron attached. Fig. 3 shows the slide detached.

In the drawings, A is the belt or zone formed of hard rubber. B represents an apron temporarily attached thereto. C is a slide, through which the ends of the zone A pass, as shown in Fig. 2. The slide C is constructed in length about equal to twice the width of the zone or belt, and the opening or slot allows the two ends of the belt to pass through and fit snugly, so as to avoid the use of buckles or catches of any kind.

Any apron, shield, or other desired garment is attached to the zone A in such a way that it may be readily slid off or upon said zone, as indicated in the drawings. The zone is then placed around the waist, and the two ends passed through the slide and tightened, as desired. Its natural spring keeps it in proper contact with the person, not allowing it to be too tight or too loose, and the slide holds it securely in place.

When desired to be used as a page, all that it is necessary to do is to tuck the garment between the zone and the body of the person wearing it.

The advantages that I claim for my invention are, cheapness, durability, and effectiveness in its action. Its use as a lady's page or apron-supporter is sufficiently evident not to need remark. It is also evident that the peculiar curve of the zone, acted upon by the peculiar slide, secures the result aimed at, and avoids the use of clasps or buckles.

The hard-rubber zone A may be plain or ornamented, and is constructed as a spring, and tempered to assume in its normal state about the position shown in Fig. 1.

Having thus described my invention, what I claim as new, and desire to secure by Letters Patent, is—

The combination of the hard-rubber spring-zone A and slide C, when constructed and arranged to operate relatively to each other, substantially as described, and for the purpose set forth.

WM. H. CHIPLEY.

Witnesses:
C. M. ANDERS,
GIBSON SMITH.